(12) United States Patent
Fan et al.

(10) Patent No.: US 10,604,621 B2
(45) Date of Patent: Mar. 31, 2020

(54) POROUS ULTRA-SOFT ULTRA-FINE DENIER POLYESTER FIBER AND ITS PREPARATION METHOD

(71) Applicant: JIANGSU HENGLI CHEMICAL FIBRE CO., LTD., Wujiang (CN)

(72) Inventors: Hongwei Fan, Wujiang (CN); Shanshui Wang, Wujiang (CN); Zhujun Ding, Wujiang (CN); Lili Wang, Wujiang (CN); Zangzang Niu, Wujiang (CN); Xiaohua Sun, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 16/322,952

(22) PCT Filed: Jun. 26, 2017

(86) PCT No.: PCT/CN2017/089946
§ 371 (c)(1),
(2) Date: Feb. 3, 2019

(87) PCT Pub. No.: WO2018/040691
PCT Pub. Date: Mar. 8, 2018

(65) Prior Publication Data
US 2019/0185616 A1 Jun. 20, 2019

(30) Foreign Application Priority Data
Aug. 31, 2016 (CN) .......................... 2016 1 0784178

(51) Int. Cl.
| | | |
|---|---|---|
| C08G 63/183 | (2006.01) | |
| D01D 5/247 | (2006.01) | |
| D01D 5/253 | (2006.01) | |
| D01D 5/08 | (2006.01) | |
| C08G 63/91 | (2006.01) | |
| D01D 4/02 | (2006.01) | |
| D01F 6/84 | (2006.01) | |

(52) U.S. Cl.
CPC ......... *C08G 63/183* (2013.01); *C08G 63/916* (2013.01); *D01D 4/02* (2013.01); *D01D 5/08* (2013.01); *D01D 5/247* (2013.01); *D01D 5/253* (2013.01); *D01F 6/84* (2013.01); *D10B 2331/04* (2013.01)

(58) Field of Classification Search
CPC ....... C08G 63/183; C08G 63/916; D01F 6/84; D01D 5/08; D01D 4/02; D10B 2331/04
See application file for complete search history.

(56) References Cited

U.S. PATENT DOCUMENTS

| | | | | |
|---|---|---|---|---|
| 4,141,207 A | * | 2/1979 | Mizushima | .......... D02G 1/0293 57/243 |
| 2012/0202964 A1 | * | 8/2012 | Li | .......... C08G 63/672 528/301 |
| 2012/0316315 A1 | | 12/2012 | Bian | |
| 2019/0153621 A1 | * | 5/2019 | Fan | .......... D01D 4/02 |

FOREIGN PATENT DOCUMENTS

| | | | | |
|---|---|---|---|---|
| CN | 1534114 A | | 10/2004 | |
| CN | 102030893 A | | 4/2011 | |
| CN | 102648231 A | * | 8/2012 | .......... C08G 63/672 |
| CN | 102851757 A | | 1/2013 | |
| CN | 104328550 A | * | 2/2015 | |
| CN | 106283261 A | | 1/2017 | |
| CN | 106400166 A | * | 2/2017 | |
| KR | 1573250 B1 | | 12/2015 | |

OTHER PUBLICATIONS

CN104328550 ESPACENET English Abstract, downloaded Jun. 21, 2019. (Year: 2019).*
CN104328550 English Machine Translation, downloaded Jun. 21, 2019. (Year: 2019).*
CN106400166 English Machine Translation, downloaded Jun. 21, 2019. (Year: 2019).*

* cited by examiner

*Primary Examiner* — Christopher M Rodd
(74) *Attorney, Agent, or Firm* — Bayramoglu Law Offices LLC (57) ABSTRACT

A porous ultra-soft ultra-fine denier polyester fiber and preparation method. The modified polyester is spun with a porous spinneret to produce the porous ultra-soft ultra-fine denier polyester fiber, and the spinneret holes on the porous spinneret are arranged in an elliptical arrangement. The porous ultra-soft ultra-fine denier polyester fiber is obtained by metering, extruding, cooling, oiling and high-speed winding the modified polyester chips. The preparation method of modified polyester is as follows: terephthalic acid reacts with ethylene glycol to produce ethylene terephthalate. The modified polyester is obtained by the reaction of terephthalic acid with branched diol. The fiber of the invention has good properties and the deviation rate of fiber density. The deviation rate of fiber density is ≤0.5%, the CV value of breaking strength is ≤4.0%, the CV value of elongation at break is ≤8.0%, the CV value of yarn unevenness is ≤2.0%.

9 Claims, 2 Drawing Sheets

POROUS ULTRA-SOFT ULTRA-FINE DENIER POLYESTER FIBER AND ITS PREPARATION METHOD

CROSS REFERENCE TO THE RELATED APPLICATIONS

This application is the national phase entry of International Application No. PCT/CN2017/089946, filed on Jun. 26, 2017, which claims priority from the Chinese patent application no. 201610784178.9 filed on Aug. 31, 2016, the entire contents of which are incorporated herein by reference.

TECHNICAL FIELD

The invention relates to the field of polyester fiber and relates to a porous ultra-soft ultra-fine denier polyester fiber and its preparation method.

BACKGROUND

Poly (ethylene terephthalate) (PET fiber or polyester fiber) fiber has high breaking strength and elastic modulus, moderate elasticity and excellent heat setting since it is invented. Heat resistance and light resistance, acid resistance, alkali resistance and corrosion resistance are a series of excellent properties, and the fabric has the advantages of crease resistance, ironing resistance, good fastness and so on. It is widely used in clothing, home textile and other fields.

However, because of the high crystallinity, dense structure and no functional groups on the molecular chain, the dye molecules are difficult to enter the fiber, and it is difficult to dye. Cannot meet people for bright and beautiful, unique style of fabric demand.

The reason for the difficulty of PET staining is that PET belongs to symmetrical straight chain macromolecules, the molecular chain does not contain side chain groups, and the regularity is very good. Its main chain contains rigid benzene ring and flexible hydrocarbon group. The ester group and benzene ring directly connected with the benzene ring form a rigid conjugate system, which restricts the free rotation of the flexible segment. This structure increases the wall and ridge of molecular chain motion, which leads to the higher glass transition temperature of PET. It is necessary to promote the diffusion of dye molecules to the fiber at very high temperature, and complete the dyeing process. In addition, the molecular chains of PET are regular, good crystallinity, tight arrangement of molecular chains, and there are no polar groups on the molecular chains that interact with dye molecules, which makes the coloring of PET fibers more difficult.

Therefore, the normal dyeing of PET fibers under high temperature and high pressure, the choice of disperse dyes dyeing, when the temperature of PET fiber to get glass transition temperature, PET fiber polymer molecule void increased, but its free volume increase is small. The dyeing rate is not high, but the energy consumption and the low dye uptake rate caused by the high temperature and high pressure method are the main problems now. In addition, the PET fiber is relatively high, which is not conducive to processing.

There are many methods for preparing PET fibers, among which melt spinning is one of the most widely used in industrial production. There are many parameters in the process of melt spinning. These parameters determine the forming process of the fiber and the structure and properties of the spun fiber. In production, the required properties are obtained by controlling these parameters. According to the technological process, the main spinning parameters controlled in production can be summarized as melting condition, spinneret condition, curing condition, winding condition, etc. Among them, the cooling and curing conditions of yarn strip have a decisive effect on the structure and properties of the fiber. In order to control the cooling rate and uniformity of polyester melt, cooling blowing is widely used in production. Cooling and blowing can accelerate the cooling rate of melt fine flow, which is helpful to increase the spinning speed, strengthen the convection of air around the yarn strip, make the inner and outer layer yarn strip cool evenly, and create conditions for the adoption of porous spinneret. Cooling and blowing can improve the quality of primary fiber and improve the tensile properties, which is beneficial to improve the production capacity of the equipment.

For a long time, chemical fiber production has been using side blowing as cooling method. Energy consumption accounts for a large part of the production cost of yarn. With the increasing demand for the properties and quality of chemical fiber, The development of the new product of chemical fiber yarn is developing towards the direction of high value-added differential fiber, which requires higher cooling and blowing conditions, so a ring blowing device is proposed. The ring blowing device not only has the advantage of uniform wind load per bundle, but also has low energy consumption, which effectively solves the problem of wind energy loss caused by the large blowing area.

In the spinning process, although the ring blowing has obvious advantages, there are still some problems: because the spun silk is extruded from the circular spinneret and cooled through the ring blowing, because the number of circular spinneret rings is more, This makes it difficult for the ring to blow into the innermost layer, causing the innermost silk to remain uncooled after the outermost silk has cooled, resulting in problems such as uneven fineness, uneven strength, uneven dyeing, and so on. As a result, the further processing of the silk may be difficult.

SUMMARY

The purpose of the invention is to overcome the problems of dyeing irregularity and poor mechanical properties of the existing polyester fibers, to realize large-scale production spinning, and to provide a preparation method of the porous ultra-soft ultra-fine denier polyester fiber. The raw material of the polyester fiber of the invention is modified polyester, the molecular chain of modified polyester is introduced into the chain of diol containing branched chain, the modified polyester fiber prepared by modified polyester, under certain temperature conditions, The space gap between molecular chains of modified polyester fibers is much larger than that of ordinary polyester fibers without branched chains at the same temperature, which is beneficial to the degree of tiny particles such as dye into the interior and to the higher dyeing rate. The melt viscosity of the modified polyester fiber is reduced, the processing temperature is reduced, and the degradation rate is reduced, which is beneficial to the processing. In addition, the structure regularity of the modified polyester fiber is not greatly damaged by the diol chain containing the branched chain. The excellent properties of polyester fiber are maintained. The spinning process of the invention adopts a spinneret arranged with a spinneret ellipse, which is advantageous to the uniform and sufficient cooling of the fiber during spinning, and the difference between the properties and structure of the fibers is relatively small, thus improving the dyeing uniformity and mechanical properties of the fibers.

In order to achieve the above purpose, the technical proposal of the invention is as follows:

The porous ultra-soft ultra-fine denier polyester fiber, wherein the material of the porous ultra-soft ultra-fine denier polyester fiber is a modified polyester, and the modified polyester is composed of a terephthalic acid chain, an ethylene glycol chain and a diol chain containing a branched chain. The branched diol segment locates on a non-terminal carbon in the diol chain segment and the branched chain is a diol chain segment containing a straight chain carbon chain of 5-10 carbon atoms.

The size of the porous ultra-soft ultra-fine denier polyester fiber is 0.20-0.50 dtex. The initial modulus is 65 cN/dtex. The breaking strength is 3.8 cN/dtex. The elongation at break is 35.0±3.0%. At the temperature of 80° C.-130° C., the space gap between molecular chains in the fiber increased by 10-30 v/v %. At the temperature of 260-290° C., the melt viscosity will decrease by 10-20%. The deviation rate of fiber density of the porous ultra-soft ultra-fine denier polyester fiber is 0.5%. The CV value of breaking strength 4.0%, and the CV value of elongation at break is 8.0%, and the CV value of coiling shrinkage coefficient of variation 8.0%, and the CV value of yarn unevenness is 2.0%. The increase of the space gap between the molecular chains refers to the comparison of the spatial gaps between molecular chains at the same temperature between modified polyester and common polyester.

This invention also provides a preparation method of this porous ultra-soft ultra-fine denier polyester fiber, in which the modified polyester is spun from a porous spinneret to produce a porous ultra-soft ultra-fine denier polyester fiber, and the arrangement of the spinneret holes in the porous spinneret is an elliptical arrangement. The elliptical arrangement means that the center of the spinning hole of the spinneret is located on the concentric ellipse, the concentric ellipse is a series of ellipses, the long axis collinear of all the ellipses, and the short axis collinear.

The preparation method of the porous ultra-soft ultra-fine denier polyester fiber is as follows: Granulate the modified polyester to obtain modified polyester chips, then obtain porous ultra-soft ultra-fine denier polyester fiber by metering, extruding, cooling, oiling and high-speed winding the modified polyester chips.

The process of preparing the modified polyester is:
(1) Preparation of Terephthalic Acid Glycol Ester:
Mix terephthalic acid and branched hexanediol to slurry, and carry out the esterification reaction under the catalytic action of concentrated sulfuric acid to obtain a terephthalic acid glycol ester. The branched hexanediol refers to a diol having a branched chain which is a non-terminal carbon in the ethylene glycol segment and a branched chain having a linear carbon chain of 5 to 10 carbon atoms.
(2) Preparation of Ethylene Terephthalate:
Mix the terephthalic acid and the ethylene glycol to slurry, carry out the esterification reaction to obtain ethylene terephthalate.
(3) Preparation of Modified Polyester:
After the esterification reaction in the step (2) is completed, add the terephthalic acid glycol ester prepared in the step (1), stir and mix, run the polycondensation reaction under the action of the catalyst and the stabilizer, and under the condition of the negative pressure. First in a low vacuum stage and then in a high vacuum stage to obtain a modified polyester.

As a preferred method:
In the preparation method of the porous ultra-soft ultra-fine denier polyester fiber as put forward, the detailed process of preparing the modified polyester is:
(1) Preparation of Terephthalic Acid Glycol Ester:
Add the slurry of the terephthalic acid and the branched hexanediol to the reactor, and carry out the esterification reaction under the catalytic action of concentrated sulfuric acid. The esterification reaction is carried out under a pressurized nitrogen environment, and the pressure is normal pressure to 0.3 MPa, and the temperature is 180-240° C. The reaction ends when the water distillation amount in the esterification reaction reaches 90% of the theoretical value or more than that. Then the terephthalic acid glycol ester is obtained.
(2) Preparation of Ethylene Terephthalate:
Add the slurry of the terephthalic acid and ethylene glycol into a reactor and then carry out the esterification reaction. The esterification reaction is carried out under a pressurized nitrogen environment, and the pressure is normal pressure to 0.3 MPa, and the temperature is 250-260° C. The reaction ends when the water distillation amount in the esterification reaction reaches 90% of the theoretical value or more than that. Then the ethylene terephthalate is obtained.
(3) Preparation of Modified Polyester:
After the end of the esterification reaction in the step (2), add the terephthalic acid glycol ester prepared in the step (1), stir and mix for 15-20 minutes under the action of the catalyst and the stabilizer, and a negative pressure. Carry out the polycondensation reaction under the condition of the low-vacuum stage, the pressure is smoothly pumped from normal pressure to an absolute pressure under 500 Pa, the temperature is controlled at 260~270° C., and the reaction time is 30~50 minutes. Then turn to high vacuum stage, the polycondensation reaction continues and the reaction pressure is reduced to an absolute pressure of less than 100 Pa, and the reaction temperature is controlled at 275 to 280° C., and the reaction time is 50 to 90 minutes in order to obtain a modified polyester.

The main spinning process parameters of the porous ultra-soft ultra-fine denier polyester fiber are as follows:
Extruding temperature: 290-295° C.;
Wind temperature: 20-25° C.;
HT1 temperature: 75-95° C.;
HT2 temperature: 120-130° C.;
Winding speed: 3000-4000 m/min.

In the preparation method of the porous ultra-soft ultra-fine denier polyester fiber as put forward, a method for preparing a porous ultra-soft ultra-fine denier polyester fiber, wherein, in step (1), the molar ratio of terephthalic acid to branched diol is 1:1.3-1.5. The amount of concentrated sulfuric acid added is 0.3-0.5% of the weight of terephthalic acid; The concentration of concentrated sulfuric acid is 50-60 wt %;

In step (2), the molar ratio of terephthalic acid to ethylene glycol is 1:1.2-2.0;

In step (3), the molar percentage value of the diol terephthalate and ethylene terephthalate is 2-5%; the catalyst is antimony trioxide, antimony glycol or antimony acetate, and the amount of catalyst added is 0.01%-0.05% of the total weight of terephthalic acid; The stabilizer is triphenyl phosphate, trimethyl phosphate or trimethyl phosphite, and the amount of stabilizer added is 0.01%-0.05% of the total weight of terephthalic acid;

The number average molecular weight of the modified polyester is 15000-30000.

In the preparation method of the porous ultra-soft ultra-fine denier polyester fiber as put forward, the branched hexanediol is chosen from one or more of the 2-pentyl-1,6-hexanediol, 2-hexyl-1,6-hexanediol, 2-heptyl-1,6-hexanediol, or 2-octyl-1,6-hexanediol.

In the preparation method of the porous ultra-soft ultra-fine denier polyester fiber as put forward, the arrangement of the spinneret holes is long axis and/or short axis symmetry.

In the preparation method of the porous ultra-soft ultra-fine denier polyester fiber as put forward, the ratio of the long axis of the ellipse to the length of the short axis is 1.3-1.8; the spacing of the adjacent spinneret holes is greater than the diameter of the guide hole equal to the diameter of the guide hole of the spinneret hole plus 1.5 mm. When the effective area of the spinneret is the same, since the circumference of the elliptical shape is larger than the circumference of the circle, the number of layers of the elliptical array of the spinneret holes is smaller than the number of layers of the circular array, and the number of holes of the spinneret ellipse is larger than The number of holes arranged in a circular shape, therefore, the elliptical arrangement of the spinning holes facilitates the cooling of the ring blowing, improves the cooling efficiency of the ring blowing, and the fiber properties are also more excellent. The ratio of the length of the major axis to the minor axis is closer to 1, the closer the ellipse is to the circle, the difference between the cooling efficiency and the cooling effect is not large; when the ratio of the length of the major axis to the minor axis is 1.3, the cooling effect is significantly improved, and the number of holes per hole is increased. A corresponding increase of 16%; when the ratio of the length of the major axis to the minor axis is 1.8, the cooling effect is greatly improved, and the number of single-turn holes is correspondingly increased by 33%. In the case of the same number of holes, the elliptical arrangement of the present invention is arranged in a conventional concentric arrangement. The number of turns is reduced, and the cooling air is easily blown, so that the fiber cooling conditions of the inner and outer rings are more uniform; when the ratio of the length of the long axis to the short axis is greater than 1.8, the ellipse tends to form a flat shape, which is difficult to punch, and the cooling effect is no longer increased. high. Therefore, the ratio of the length of the major axis to the length of the short axis of the series ellipse is 1.3 to 1.8, which can achieve higher cooling efficiency and better cooling effect.

In the preparation method of the porous ultra-soft ultra-fine denier polyester fiber as put forward, the spinneret is a circular spinneret or an elliptical spinneret; The difference between the diameter of the circular spinneret and the maximum length of the long axis of the series ellipse is greater than 10 mm, and the difference value between the elliptical spinneret and the maximum length of the long axis of the series ellipse is greater than 10 mm.

In the preparation method of the porous ultra-soft ultra-fine denier polyester fiber as put forward, the guide hole diameter of the spinneret is 1.5-2.5 mm; the number of spinneret holes is greater than or equal to 192.

In the preparation method of the porous ultra-soft ultra-fine denier polyester fiber as put forward, the cross-section shape of the spinneret spinning hole is one kind of circular, square, diamond, straight line, triangular, trilobal, hollow or flat.

The principles of this invention are:

For the unbranched polyester fiber, the molecular chain structure is a linear macromolecule containing a benzene ring structure, the functional groups on the molecular chain are arranged neatly, the regularity is good, the flexibility is poor, and the free volume increase is small when the temperature is raised. These characteristics hinder the dye from entering the inside of the polyester fiber, and thus the dyeing performance is poor.

The raw material of the polyester fiber of the invention is a modified polyester, and the branched hexane diol segment contained in the modified polyester macromolecule, when the temperature is higher than the glass transition temperature, the branch moves before the main chain. The increase of the free volume is much larger than that of the unbranched polyester macromolecular chain. The increase of the free volume increases the degree of entry of the fine particles into the interior of the polyester. The free volume of the polyester fiber prepared by the modified polyester is far. It is much larger than the unbranched polyester fiber at the same temperature, which increases the diffusion degree of the dye and improves the dyeing performance of the polyester fiber. At the same time, the polyester fiber prepared by the modified polyester is advantageous for lowering the melt viscosity and improving the processing property. The introduction of the branched hexanediol segment does not cause much damage to the structural regularity of the polyester fiber, and maintains the excellent properties of the polyester fiber.

When the effective area of the spinneret is the same, since the circumference of the elliptical shape is larger than the circumference of the circle, the number of layers of the elliptical array of the spinneret holes is smaller than the number of layers of the circular array, and the number of holes of the spinneret ellipse is larger than The number of holes arranged in a circular shape, the spinneret arranged in an elliptical shape of the spinning holes enables the fibers to be cooled rapidly and uniformly, and the difference in structure and performance between the fibers is small, which is advantageous for improving the dyeing uniformity of the fibers and the properties of the fibers.

Benefits:

(1) The arrangement of the orifices on the spinneret of the present invention is elliptical. When the effective area of the spinneret is the same, the number of layers of the orifices in the elliptical arrangement is smaller than the number of layers arranged in the circle, and the ring blowing is easier. The spinning fine flow is blown, the cooling effect of the spinning fine flow is better, and the prepared fiber performance is also more excellent.

(2) The arrangement of the orifices on the spinneret of the present invention is elliptical. When the effective area of the spinneret is the same, the number of holes in the elliptical shape of the spinneret is larger than the number of holes arranged in the circle, and the elliptical arrangement can Achieve greater cooling and significantly increase cooling efficiency.

(3) The porous ultra-soft ultra-fine denier polyester fiber obtained by the invention is made of modified polyester, and the branched polyester hexanediol segment contained in the modified polyester macromolecule is higher than the glass transition temperature. When the branch chain moves before the main chain, the increase of the free volume is much larger than that of the unbranched polyester macromolecular chain. The increase of the free volume increases the degree of entry of the fine particles into the interior of the polyester, and increases by the branch. The free volume of the polyester fiber increases the degree of diffusion of the dye and improves the dyeing properties of the polyester fiber.

(4) The porous ultra-soft ultra-fine denier polyester fiber obtained by the invention has an increase in the free volume of the polyester fiber, which is advantageous for lowering the melt viscosity and improving the processing property.

(5) The porous ultra-soft ultra-fine denier polyester fiber obtained by the invention has no significant damage to the structural regularity of the polyester fiber with the branched hexanediol segment, and maintains the excellent performance of the polyester fiber.

(6) The porous ultra-soft ultra-fine denier polyester fiber prepared by the invention has excellent dyeing property and mechanical property, the initial modulus is ≤65 cN/dtex, and the fiber density deviation rate of the porous super-soft ultra-fine denier polyester fiber is ≤0.5%, and the CV value of breaking strength is ≤4.0%, the CV value of elongation at break is ≤8.0%, and the CV value of yarn unevenness is ≤2.0%.

DETAILED DESCRIPTION OF THE EMBODIMENTS

Hereinafter, the present invention will be described in more detail by the following examples. It should be noticed that these examples are only for illustrating the present invention and are not intended to limit the scope of the present invention. In addition, it should be noticed that after reading the content of the present invention, those skilled in this field can make various modifications or changes to the present invention, and these equivalent forms also apply to the scope of the appended Claims of this application.

Example 1-28

A preparation method of a modified polyester, including the following steps:

(1) Preparation of Terephthalic Acid Glycol Esters:

Add the terephthalic acid and B at a molar ratio of A as a mixture into the reactor at a concentration of Cwt %, and the amount added is D % by weight of terephthalic acid. Under the catalysis of sulfuric acid, the esterification reaction is carried out. The esterification reaction is pressurized to E MPa under a nitrogen environment, the pressure is normal pressure, the temperature is F° C. The esterification reaction ends until the water distillation amount in the esterification reaction reaches G % of the theoretical value, and the terephthalic acid glycol ester is obtained.

(2) Preparation of Ethylene Terephthalate:

The terephthalic acid and ethylene glycol having a molar ratio of H are mixed into the reactor, and then the esterification reaction is carried out. The esterification reaction is pressurized to I MPa under a nitrogen environment, and a temperature of F° C. When the water distillation amount in the esterification reaction reaches K % of the theoretical value, the esterification reaction ends, and ethylene terephthalate is obtained;

(3) Preparation of Modified Polyester:

Add the terephthalate diol phthalate ester diol prepared in step (1) after completion of the esterification reaction in step (2). The molar percentage of terephthalate diol phthalate ester diol and ethylene glycol terephthalate is of L %. Stir and mix for M minutes. Add N % of 0 as catalyst in a total amount of terephthalic acid and P % of Q as stabilizer in a total amount of terephthalic acid. The polycondensation reaction in the low vacuum phase is started under the condition of negative pressure. The pressure is smoothly pumped from atmospheric pressure to an absolute pressure of R Pa, the temperature is controlled at S ° C., and the reaction time is T minutes, then the vacuum is continued for the high vacuum phase. The polycondensation reaction is carried out to reduce the reaction pressure to an absolute pressure of U Pa, the reaction temperature is controlled at V ° C., and the reaction time is W minutes. Then we can obtain the modified polyester.

The modified polyester obtained has a number average molecular weight of X and consists of terephthalic acid segment, ethylene glycol segment and branched B segment. The molar percentage of branched B segment and the ethylene glycol segment is Y %.

The parameters of the variation in the different examples are shown in the following table. In the table, "BA" represents 2-pentyl-1,6-hexanediol, "BB" represents 2-hexyl-1,6-hexanediol, and "BC" represents 2-heptyl-1,6-hexanediol," "BD" stands for 2-octyl-1,6-hexanediol,—"OA" represents bismuth trioxide, "OB" stands for ethylene glycol oxime, "OC" stands for yttrium acetate, "QA" stands for triphenyl phosphate, "QB" stands for trimethyl phosphate, and "QC" stands for trimethyl phosphite. The proportional relationship is the molar ratio.

TABLE 1 parameters of the variation in the different examples

| EXAMPLES | A | B | C | D | E | F | G | H | I | J | K | L | M |
|---|---|---|---|---|---|---|---|---|---|---|---|---|---|
| 1 | 1:1.3 | BA | 50 | 0.3 | 0.1 | 180 | 90 | 1:1.2 | 0.1 | 250 | 90 | 2 | 15 |
| 2 | 1:1.38 | BB | 55 | 0.32 | 0.13 | 181 | 91 | 1:1.3 | 0.12 | 251 | 91 | 2.1 | 16 |
| 3 | 1:1.33 | BC | 55 | 0.33 | 0.12 | 183 | 92 | 1:1.31 | 0.31 | 252 | 92 | 2.2 | 16 |
| 4 | 1:1.34 | BD | 60 | 0.34 | 0.13 | 184 | 93 | 1:1.32 | 0.33 | 253 | 93 | 2.3 | 17 |
| 5 | 1:1.37 | BA | 60 | 0.38 | 0.16 | 187 | 93.4 | 1:1.36 | 0.16 | 256 | 93.4 | 2.6 | 19 |
| 6 | 1:1.38 | BB | 55 | 0.39 | 0.17 | 188 | 93.5 | 1:1.37 | 0.17 | 257 | 93.5 | 2.7 | 19 |
| 7 | 1:1.39 | BC | 50 | 0.4 | 0.17 | 188 | 93.5 | 1:1.37 | 0.17 | 257 | 93.5 | 2.8 | 16 |
| 8 | 1:1.4 | BD | 55 | 0.4 | 0.17 | 188 | 93.5 | 1:1.38 | 0.18 | 257.8 | 93.6 | 3 | 17 |
| 9 | 1:1.46 | BD | 60 | 0.49 | 0.28 | 233 | 92 | 1:1.8 | 0.28 | 259 | 92 | 4.5 | 19 |
| 10 | 1:1.49 | BC | 60 | 0.48 | 0.28 | 230 | 92 | 1:1.8 | 0.38 | 258 | 92 | 4.7 | 19 |

TABLE 1-continued parameters of the variation in the different examples

| | | | | | | | | | | | | | |
|---|---|---|---|---|---|---|---|---|---|---|---|---|---|
| 11 | 1:1.467 | BB | 60 | 0.47 | 0.27 | 236 | 92 | 1:1.89 | 0.38 | 258 | 92 | 4.3 | 18 |
| 12 | 1:1.48 | BA | 55 | 0.46 | 0.28 | 230 | 92 | 1:1.88 | 0.28 | 256 | 92 | 4.7 | 18 |
| 13 | 1:1.43 | BD | 60 | 0.47 | 0.27 | 235 | 92 | 1:1.78 | 0.26 | 255 | 92 | 4.3 | 17 |
| 14 | 1:1.43 | BC | 55 | 0.45 | 0.29 | 235 | 92 | 1:1.87 | 0.27 | 255 | 92 | 4.6 | 18 |
| 15 | 1:1.457 | BB | 55 | 0.46 | 0.28 | 239 | 92 | 1:1.81 | 0.27 | 255 | 92 | 4.41 | 19 |
| 16 | 1:1.47 | BA | 55 | 0.48 | 0.27 | 245 | 92 | 1:1.81 | 0.27 | 259 | 92 | 4.67 | 19 |
| 17 | 1:1.45 | BB + BA (3:1) | 55 | 0.49 | 0.26 | 236 | 92 | 1:1.8 | 0.28 | 258 | 92 | 4.4 | 18 |
| 18 | 1:1.45 | BD + BA (3:2) | 60 | 0.45 | 0.28 | 239 | 92 | 1:1.84 | 0.29 | 255 | 92 | 4.6 | 18 |
| 19 | 1:1.45 | BB + BA (3:1) | 44 | 0.49 | 0.26 | 236 | 96 | 1:1.8 | 0.28 | 258 | 92 | 4.4 | 18 |
| 20 | 1:1.45 | BD + BA + BB (3:2:1) | 60 | 0.47 | 0.29 | 235 | 92 | 1:1.8 | 0.27 | 258 | 92 | 4.71 | 18 |

| EXAMPLES | N | O | P | Q | R | S | T | U | V | W | X | Y |
|---|---|---|---|---|---|---|---|---|---|---|---|---|
| 1 | 0.01 | OA | 0.01 | QA | 500 | 260 | 30 | 100 | 275 | 50 | 15000 | 2 |
| 2 | 0.011 | OA | 0.02 | QA | 490 | 262 | 31 | 99 | 276 | 51 | 16000 | 2.1 |
| 3 | 0.03 | OA | 0.02 | QA | 498 | 263 | 32 | 80 | 277 | 57 | 15900 | 2.2 |
| 4 | 0.033 | OA | 0.023 | QA | 497 | 264 | 33 | 80 | 278 | 58 | 15800 | 2.3 |
| 5 | 0.036 | OA | 0.025 | QA | 496 | 267 | 36 | 70 | 278 | 61 | 16000 | 2.6 |
| 6 | 0.036 | OA | 0.025 | QA | 496 | 267 | 36 | 60 | 278 | 61 | 17000 | 2.7 |
| 7 | 0.04 | OB | 0.026 | QB | 497 | 268 | 38 | 50 | 279 | 62 | 18000 | 2.8 |
| 8 | 0.03 | OB | 0.027 | QB | 498 | 269 | 39 | 50 | 278 | 64 | 19000 | 3 |
| 9 | 0.044 | OA | 0.046 | QA | 490 | 269 | 48 | 40 | 279 | 87 | 29000 | 4.5 |
| 10 | 0.048 | OB | 0.047 | QA | 460 | 267 | 48 | 40 | 279 | 83 | 27000 | 4.7 |
| 11 | 0.04 | OA | 0.041 | QC | 490 | 268 | 48 | 40 | 278 | 85 | 29000 | 4.3 |
| 12 | 0.047 | OA | 0.047 | QA | 480 | 265 | 47 | 40 | 279 | 85 | 28000 | 4.7 |
| 13 | 0.043 | OA | 0.049 | QA | 490 | 268 | 46 | 40 | 275 | 85 | 28000 | 4.3 |
| 14 | 0.047 | OB | 0.04 | QA | 470 | 268 | 45 | 40 | 279 | 83 | 29000 | 4.6 |
| 15 | 0.042 | OA | 0.048 | QC | 495 | 265 | 45 | 50 | 275 | 85 | 28000 | 4.41 |
| 16 | 0.041 | OA | 0.042 | QA | 485 | 268 | 46 | 50 | 275 | 89 | 29000 | 4.67 |
| 17 | 0.042 | OA | 0.047 | QC | 495 | 265 | 49 | 50 | 278 | 88 | 29000 | 4.4 |
| 18 | 0.0423 | OA | 0.045 | QC | 495 | 265 | 45 | 50 | 278 | 85 | 28000 | 4.6 |
| 19 | 0.042 | OA | 0.047 | QC | 495 | 265 | 49 | 50 | 278 | 88 | 29000 | 4.4 |
| 20 | 0.04 | OA | 0.041 | QC | 490 | 268 | 49 | 50 | 277 | 84 | 29000 | 4.71 |

Example 29

The invention relates to a preparation method of the porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

Figure 1:
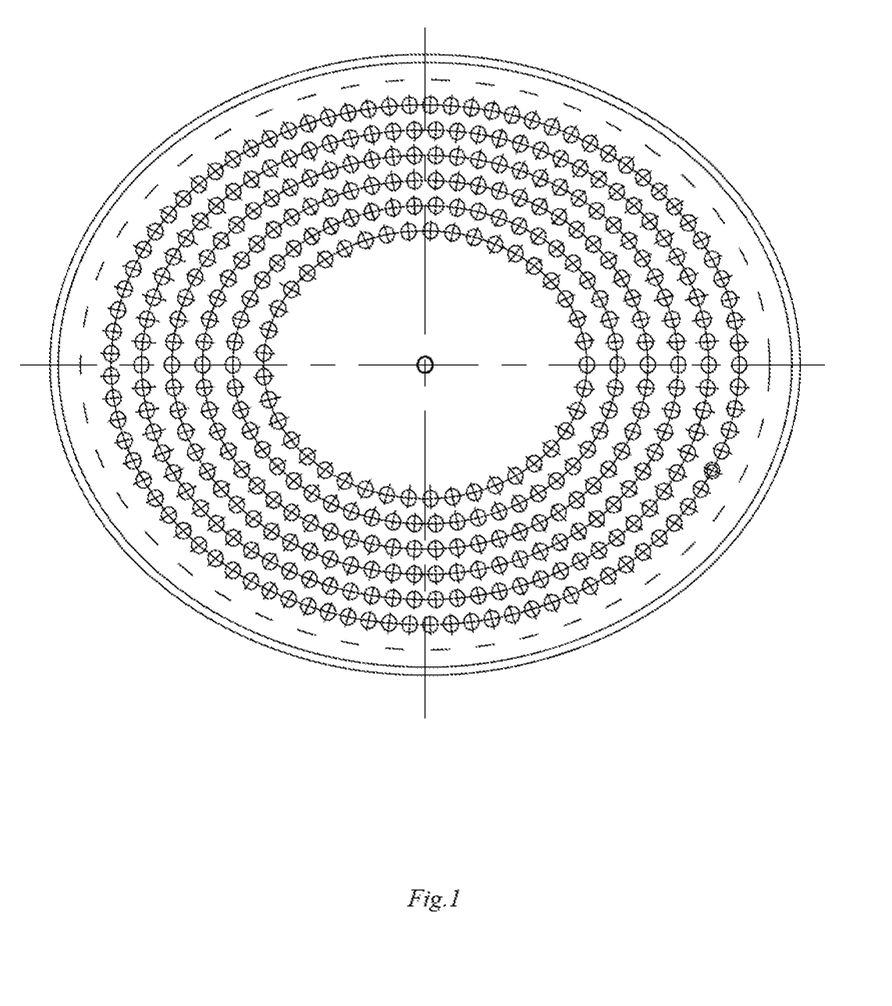
FIG. 1 is an elliptical arrangement diagram of 374 spinnerets, the orifice diameter is 2.0 mm, and the length ratio of the major axis of the ellipse to the minor axis is 1.3.

As shown in FIG. 1, the ratio of the length of the long axis to the short axis of the ellipse is 1.3, the spacing of the adjacent spinneret is equal to the diameter of the guide hole of the spinneret plus 1.5 mm, and the spinneret is a circular spinneret. The difference between the diameter of the circular spinneret and the maximum length of the long axis of the series is 11 mm, the diameter of the spinneret is 2.0 mm, the number of spinneret holes is 374, and the cross section shape of the spinneret spinning hole is circle.

The porous ultra-soft ultra-fine denier polyester fiber is prepared by metering, extruding, cooling, oiling and winding the modified polyester chips that is granulated from the modified polyester prepared in EXAMPLE 1. The main spinning process parameters are: spinning temperature 295° C., wind temperature 25° C., HT1 temperature 75° C., HT2 temperature 125° C., winding speed 4500 m/min.

The size of singular porous ultra-soft ultra-fine denier polyester fiber is 0.42 dtex, and the initial modulus is 63 cN/dtex, and the breaking strength of the yarn is 4.7 cN/dtex, the elongation at break is 34.7%. At the temperature of 80° C., the space gap between molecular chains of the porous ultra-soft ultra-fine denier polyester fiber is increased by 15 v/v %. At the temperature of 289° C., the viscosity of the fiber decreases by 16%. The fiber density deviation rate is 0.4%, the CV value of the breaking strength is 3.2%, the CV value of elongation at break is 6.9%, the CV value of yarn unevenness is 1.8%.

Example 30

The invention relates to a preparation method of the porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

Figure 3:
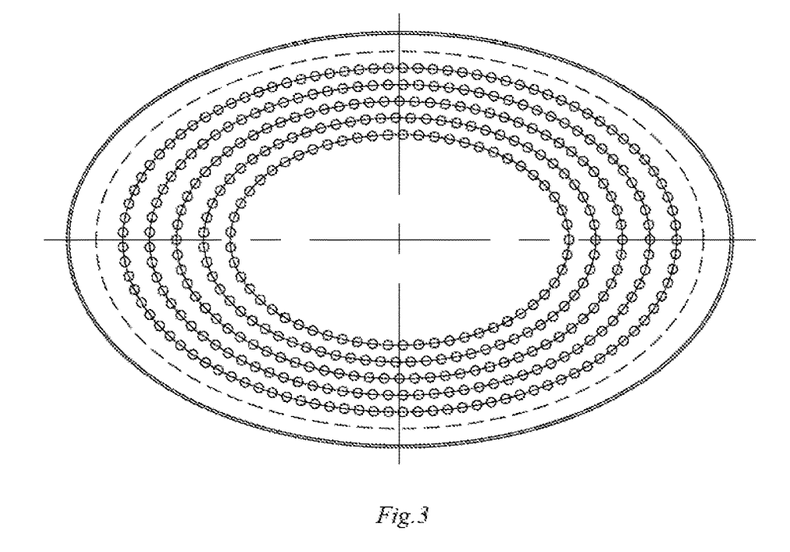
FIG. 3 is an elliptical arrangement of 382 spinnerets with a hole diameter of 2.0 mm and a length ratio of the major axis to the minor axis of 1.6.

As shown in FIG. 3, the ratio of the length of the long axis to the short axis of the ellipse is 1.6, the spacing of the adjacent spinneret is equal to the diameter of the guide hole of the spinneret plus 1.5 mm, and the spinneret is a circular spinneret. The difference between the diameter of the circular spinneret and the maximum length of the long axis of the series is 11 mm, the diameter of the spinneret is 2.0 mm, the number of spinneret holes is 382, and the cross section shape of the spinneret spinning hole is circle.

The porous ultra-soft ultra-fine denier polyester fiber is prepared by metering, extruding, cooling, oiling and winding the modified polyester chips that is granulated from the modified polyester prepared in EXAMPLE 1. The main spinning process parameters are: spinning temperature 295° C., wind temperature 25° C., HT1 temperature 75° C., HT2 temperature 125° C., winding speed 4500 m/min.

The size of the porous ultra-soft ultra-fine denier polyester fiber is 0.50 dtex, and the initial modulus is 65 cN/dtex, and the breaking strength of the yarn is 5.4 cN/dtex, the elongation at break is 35.2%. At the temperature of 80° C., the space gap between molecular chains of the porous ultra-soft ultra-fine denier polyester fiber is increased by 15 v/v %. At the temperature of 289° C., the viscosity of the fiber decreases by 16%. The fiber density deviation rate is 0.2%. The CV value of the breaking strength is 2.2%, the CV value of elongation at break is 5.9%, the CV value of yarn unevenness is 1.4%.

Comparative Example 1

The invention relates to a preparation method of porous ultra-soft ultra-fine denier polyester fiber, which is made from a porous spinneret. The arrangement of holes on the spinneret is circular, which means that the spinning hole center of the spinneret is located on a concentric circle. Concentric circle is a series of circles.

Figure 2:
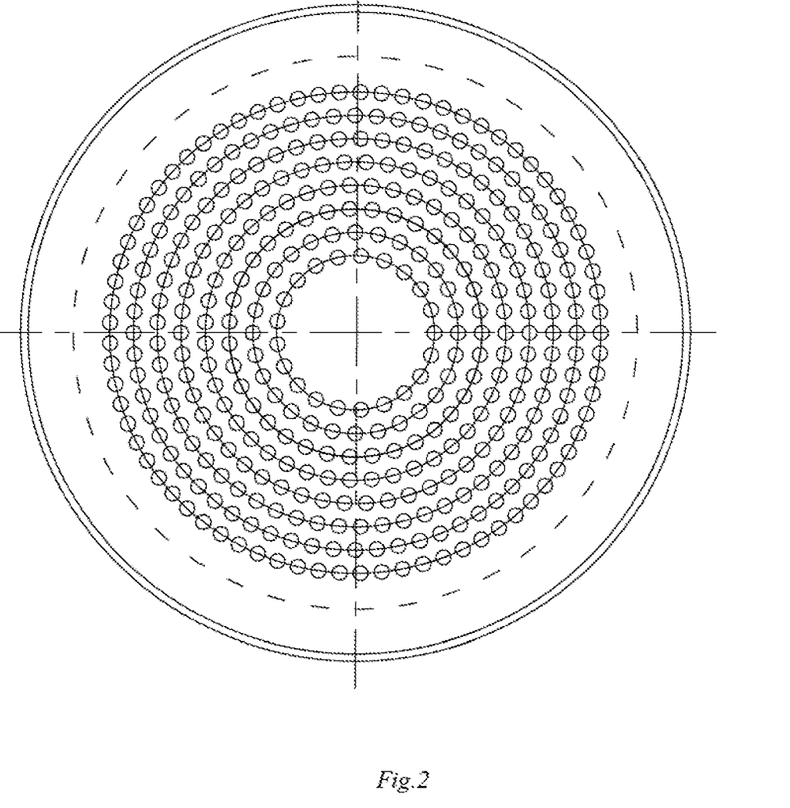
FIG. 2 is a circular arrangement diagram of 370 orifices, the orifice diameter is 2.0 mm.

As shown in FIG. 2, the spacing of the adjacent spinneret is equal to the diameter of the guide hole of the spinneret plus 1.5 mm, and the spinneret is a circular spinneret. The difference between the diameter of the circular spinneret and the maximum diameter of the circle in the series is 11 mm, the diameter of the spinneret is 2.0 mm, the number of spinneret holes is 370, and the cross section shape of the spinneret spinning hole is circle.

The porous ultra-soft ultra-fine denier polyester fiber is prepared by metering, extruding, cooling, oiling and winding the modified polyester chips that is granulated from the modified polyester prepared in EXAMPLE 1. The main spinning process parameters are: spinning temperature 295° C., wind temperature 25° C., HT1 temperature 75° C., HT2 temperature 125° C., winding speed 4500 m/min.

The size of the porous ultra-soft ultra-fine denier polyester fiber is 0.12 dtex, and the initial modulus is 60 cN/dtex, and the breaking strength of the yarn is 3.8 cN/dtex, the elongation at break is 36%. At the temperature of 80° C., the space gap between molecular chains of the porous ultra-soft ultra-fine denier polyester fiber is increased by 15 v/v %. At the temperature of 289° C., the viscosity of the fiber decreases by 16%. The fiber density deviation rate is 0.7%. The CV value of the breaking strength is 5.2%, the CV value of elongation at break is 9.1%, the CV value of yarn unevenness is 2.8%.

Comparing with Example 29, it can be seen that when the effective areas of the spinnerets are the same, and the number of spinning holes is similar (the number of spinning holes arranged in a circular array is 370, the number of spinning holes in an elliptical arrangement is 374, the number of layers of the spinning holes in elliptical arrangement is 6, which is smaller than the number (8) of the layers of spinning hole in circular arrangement, making the cooling effect better. Compared with the EXAMPLE 30, it can be seen that when the effective areas of the spinnerets are the same, the spinning holes are arranged in an elliptical shape, and the number of the layers of spinning holes in elliptical arrangement is 5, which is smaller than the circular arrangement of layers 8, making better cooling effect. The number (382) of holes of spinneret spinning hole elliptical arrangement is larger than the number (370) of spinning holes in circular arrangement, making higher cooling efficiency. Compared to the fiber properties in EXAMPLE 29 and EXAMPLE 30, the fiber density variation, the CV value of breaking strength, the CV value of elongation at break, the CV value of yarn unevenness of the fiber in EXAMPLE 29 and EXAMPLE 30 is smaller than Comparative Example 1, proving that under the same condition, the performance of the fiber made by the spinneret having the elliptical arrangement of the spinning holes is superior to that of the spinneret which is arranged in a circular shape.

Example 31-33

The invention relates to a preparation method of porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

The arrangement of the orifices is long axis symmetry. The ratio of the length of the long axis to the short axis of the ellipse is 1.4, the spacing of the adjacent spinneret is equal to the diameter of the guide hole of the spinneret plus 1.6 mm, and the spinneret is a circular spinneret. The difference between the diameter of the circular spinneret and the maximum length of the long axis of the series is 12 mm, the diameter of the spinneret is 1.5 mm, the number of spinneret holes is 192, and the cross section shape of the spinneret spinning hole is square.

The porous ultra-soft ultra-fine denier polyester fiber is prepared by metering, extruding, cooling, oiling and winding the modified polyester chips that is granulated from the modified polyester. The main spinning process parameters are: spinning temperature 290° C., wind temperature 20° C., HT1 temperature 95° C., HT2 temperature 130° C., winding speed 4000 m/min. At the temperature of 80° C., the increasing rate of the space gap between the molecular chain inside the fiber, and the decreasing rate of the melt viscosity at the temperature of 260° C., and the data of mechanical properties of the fiber is:

TABLE 2 the different shrinkage composite yarn's mechanical properties when use the polyester from EXAMPLE 2 to EXAMPLE 4

| EXAMPLE | Modified polyester source | Breaking strength (cN/dtex) | Elongation at break (%) | Increased gap (v/v/%) | Viscosity decreasing rate (%) | Fiber density deviation rate (%) | CV value of breaking strength (%) | CV value of elongation break (%) | CV value of yarn unevenness (%) | Size of singular fiber (dtex) | Initial modulus (cN/dtex) |
|---|---|---|---|---|---|---|---|---|---|---|---|
| 31 | EXAMPLE 2 | 3.8 | 32.7 | 10 | 10 | 0.5 | 4.0 | 8.0 | 1.9 | 0.22 | 60 |
| 32 | EXAMLPE 3 | 4.4 | 32.0 | 10 | 10 | 0.4 | 3.8 | 7.6 | 2.0 | 0.20 | 63 |
| 33 | EXAMPLE 4 | 4.2 | 32.9 | 10 | 10 | 0.2 | 3.7 | 7.3 | 1.5 | 0.27 | 61 |

Example 34-36

The invention relates to a preparation method of porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

The arrangement of the orifices is long axis symmetry. The ratio of the length of the long axis to the short axis of the ellipse is 1.4, the spacing of the adjacent spinneret is equal to the diameter of the guide hole of the spinneret plus 1.7 mm, and the spinneret is a circular spinneret. The difference between the diameter of the circular spinneret and the maximum length of the long axis of the series is 12 mm, the diameter of the spinneret is 1.8 mm, the number of spinneret holes is 200, and the cross section shape of the spinneret spinning hole is diamond.

The porous ultra-soft ultra-fine denier polyester fiber is prepared by metering, extruding, cooling, oiling and winding the modified polyester chips that is granulated from the modified polyester. The main spinning process parameters are: spinning temperature 295° C., wind temperature 25° C., HT1 temperature 75° C., HT2 temperature 120° C., winding speed 5000 m/min. At the temperature of 130° C., the increasing rate of the space gap between the molecular chain inside the fiber, and the decreasing rate of the melt viscosity at the temperature of 289° C., and the data of mechanical properties of the fiber is:

The arrangement of the orifices is long axis symmetry. The ratio of the length of the long axis to the short axis of the ellipse is 1.4, the spacing of the adjacent spinneret is equal to the diameter of the guide hole of the spinneret plus 1.8 mm, and the spinneret is a circular spinneret. The difference between the diameter of the circular spinneret and the maximum length of the long axis of the series is 13 mm, the diameter of the spinneret is 2.5 mm, the number of spinneret holes is 200, and the cross-section shape of the spinneret spinning hole is diamond.

The porous ultra-soft ultra-fine denier polyester fiber is prepared by metering, extruding, cooling, oiling and winding the modified polyester chips that is granulated from the modified polyester. The main spinning process parameters are: spinning temperature 291° C., wind temperature 21° C., HT1 temperature 75° C., HT2 temperature 125° C., winding speed 4400 m/min. At the temperature of 100° C., the

TABLE 3 the different shrinkage composite yarn's mechanical properties when use the polyester from EXAMPLE 5 to EXAMPLE 7

| EXAMPLE | Modified polyester source | Breaking strength (cN/dtex) | Elongation at break (%) | Increased gap (v/v/%) | Viscosity decreasing rate (%) | Fiber density deviation rate (%) | CV value of breaking strength (%) | CV value of elongation break (%) | CV value of yarn uneveness (%) | Size of singular fiber (dtex) | Initial modulus (cN/dtex) |
|---|---|---|---|---|---|---|---|---|---|---|---|
| 34 | EXAMPLE 5 | 3.9 | 33.4 | 16 | 16 | 0.4 | 3.5 | 7.5 | 1.7 | 0.34 | 60 |
| 35 | EXAMLPE 6 | 3.5 | 33.1 | 16 | 16 | 0.3 | 3.8 | 7.8 | 1.9 | 0.36 | 62 |
| 36 | EXAMPLE 7 | 3.6 | 33.5 | 16 | 26 | 0.5 | 3.6 | 7.4 | 1.4 | 0.39 | 64 |

Example 37-39

The invention relates to a preparation method of porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

increasing rate of the space gap between the molecular chain inside the fiber, and the decreasing rate of the melt viscosity at the temperature of 290° C., and the data of mechanical properties of the fiber is:

TABLE 4 the different shrinkage composite yarn's mechanical properties when use the polyester from EXAMPLE 8 to EXAMPLE 10

| EXAMPLE | Modified polyester source | Breaking strength (cN/dtex) | Elongation at break (%) | Increased gap (v/v/%) | Viscosity decreasing rate (%) | Fiber density deviation rate (%) | CV value of breaking strength (%) | CV value of elongation break (%) | CV value of yarn uneveness (%) | Size of singular fiber (dtex) | Initial modulus (cN/dtex) |
|---|---|---|---|---|---|---|---|---|---|---|---|
| 37 | EXAMPLE 8 | 3.7 | 34.4 | 20 | 20 | 0.2 | 3.1 | 7.1 | 1.5 | 0.36 | 61 |
| 38 | EXAMLPE 9 | 3.5 | 34.1 | 20 | 20 | 0.3 | 2.8 | 6.8 | 1.3 | 0.38 | 65 |
| 39 | EXAMPLE 10 | 3.9 | 34.5 | 20 | 70 | 0.4 | 2.6 | 6.4 | 1.1 | 0.39 | 63 |

Example 40-42

The invention relates to a preparation method of porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

The arrangement of the orifices is long axis symmetry. The ratio of the length of the long axis to the short axis of the ellipse is 1.7, the spacing of the adjacent spinneret is equal to the diameter of the guide hole of the spinneret plus 1.9 mm, and the spinneret is a circular spinneret. The difference between the diameter of the circular spinneret and the maximum length of the long axis of the series is 14 mm, the diameter of the spinneret is 1.5 mm, the number of spinneret holes is 210, and the cross section shape of the spinneret spinning hole is triangular.

The porous ultra-soft ultra-fine denier polyester fiber is prepared by metering, extruding, cooling, oiling and winding the modified polyester chips that is granulated from the modified polyester. The main spinning process parameters are: spinning temperature 291° C., wind temperature 24° C., HT1 temperature 85° C., HT2 temperature 122° C., winding speed 4340 m/min. At the temperature of 110° C., the increasing rate of the space gap between the molecular chain inside the fiber, and the decreasing rate of the melt viscosity at the temperature of 289° C., and the data of mechanical properties of the fiber is:

equal to the diameter of the guide hole of the spinneret plus 1.5 mm, and the spinneret is a circular spinneret. The difference between the diameter of the circular spinneret and the maximum length of the long axis of the series is 15 mm, the diameter of the spinneret is 1.8 mm, the number of spinneret holes is 240, and the cross section shape of the spinneret spinning hole is trilobal.

The porous ultra-soft ultra-fine denier polyester fiber is prepared by metering, extruding, cooling, oiling and winding the modified polyester chips that is granulated from the modified polyester. The main spinning process parameters are: spinning temperature 294° C., wind temperature 23° C., HT1 temperature 78° C., HT2 temperature 122° C., winding speed 4390 m/min. At the temperature of 120° C., the

TABLE 5 the different shrinkage composite yarn's mechanical properties when use the polyester from EXAMPLE 11 to EXAMPLE 13

| EXAMPLE | Modified polyester source | Breaking strength (cN/dtex) | Elongation at break (%) | Increased gap (v/v/%) | Viscosity decreasing rate *%) | Fiber density deviation rate (%) | CV value of breaking strength (%) | CV value of elongation break (%) | CV value of yarn uneveness (%) | Size of singular fiber (dtex) | Initial modulus (cN/dtex) |
|---|---|---|---|---|---|---|---|---|---|---|---|
| 40 | EXAMPLE 11 | 3.8 | 38.0 | 22 | 16 | 0.1 | 3.3 | 7.3 | 1.7 | 0.5 | 62 |
| 41 | EXAMLPE 12 | 3.9 | 37.7 | 22 | 16 | 0.3 | 3.1 | 7.8 | 1.4 | 0.49 | 65 |
| 42 | EXAMPLE 13 | 3.1 | 37.5 | 22 | 16 | 0.4 | 3.6 | 7.4 | 1.6 | 0.45 | 61 |

Example 43-45

The invention relates to a preparation method of porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

The arrangement of the orifices is long axis symmetry. The ratio of the length of the long axis to the short axis of the ellipse is 1.8, the spacing of the adjacent spinneret is increasing rate of the space gap between the molecular chain inside the fiber, and the decreasing rate of the melt viscosity at the temperature of 270° C., and the data of mechanical properties of the fiber is:

TABLE 6 the different shrinkage composite yarn's mechanical properties when use the polyester from EXAMPLE 14 to EXAMPLE 16

| EXAMPLE | Modified polyester source | Breaking strength (cN/dtex) | Elongation at break (%) | Increased gap (v/v/%) | Viscosity decreasing rate *%) | Fiber density deviation rate (%) | CV value of breaking strength (%) | CV value of elongation break (%) | CV value of yarn uneveness (%) | Size of singular fiber (dtex) | Initial modulus (cN/dtex) |
|---|---|---|---|---|---|---|---|---|---|---|---|
| 43 | EXAMPLE 14 | 3.4 | 32.0 | 27 | 13 | 0.3 | 3.1 | 7.1 | 1.4 | 0.23 | 61 |
| 44 | EXAMLPE 15 | 3.9 | 32.3 | 27 | 13 | 0.5 | 3.5 | 6.8 | 1.1 | 0.24 | 64 |
| 45 | EXAMLPE 16 | 3.5 | 37.5 | 27 | 13 | 0.2 | 2.9 | 6.4 | 1.5 | 0.20 | 62 |

Example 46-49

The invention relates to a preparation method of porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

The arrangement of the orifices is long axis symmetry. The ratio of the length of the long axis to the short axis of the ellipse is 1.8, the spacing of the adjacent spinneret is equal to the diameter of the guide hole of the spinneret plus 1.6 mm, and the spinneret is a circular spinneret. The difference between the diameter of the circular spinneret and the maximum length of the long axis of the series is 16 mm, the diameter of the spinneret is 2.2 mm, the number of spinneret holes is 250, and the cross section shape of the spinneret spinning hole is hollow.

The porous ultra-soft ultra-fine denier polyester fiber is prepared by metering, extruding, cooling, oiling and winding the modified polyester chips that is granulated from the modified polyester. The main spinning process parameters are: spinning temperature 291° C., wind temperature 25° C., HT1 temperature 79° C., HT2 temperature 129° C., winding speed 4600 m/min. At the temperature of 80° C., the increasing rate of the space gap between the molecular chain inside the fiber, and the decreasing rate of the melt viscosity at the temperature of 275° C., and the data of mechanical properties of the fiber is:

TABLE 7 the different shrinkage composite yarn's mechanical properties when use the polyester from EXAMPLE 17 to EXAMPLE 20

| EXAMPLE | Modified polyester source | Breaking strength (cN/dtex) | Elongation at break (%) | Increased gap (v/v/%) | Viscosity decreasing rate (%) | Fiber density deviation rate (%) | CV value of breaking strength (%) | CV value of elongation break (%) | CV value of yarn unevenness (%) | Size of singular fiber (dtex) | Initial modulus (cN/dtex) |
|---|---|---|---|---|---|---|---|---|---|---|---|
| 46 | EXAMPLE 17 | 3.4 | 33.1 | 15 | 13 | 0.4 | 3.3 | 6.1 | 1.7 | 0.37 | 63 |
| 47 | EXAMLPE 18 | 2.9 | 33.3 | 15 | 13 | 0.5 | 3.5 | 5.8 | 1.3 | 0.36 | 61 |
| 48 | EXAMPLE 19 | 3.5 | 33.5 | 15 | 13 | 0.7 | 3.9 | 5.4 | 1.5 | 0.35 | 65 |
| 49 | EXAMPLE 20 | 2.9 | 33.6 | 15 | 13 | 0.3 | 3.4 | 5.7 | 1.3 | 0.17 | 62 |

Example 50-53

The invention relates to a preparation method of porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

The arrangement of the orifices is long axis symmetry. The ratio of the length of the long axis to the short axis of the ellipse is 1.8, the spacing of the adjacent spinneret is equal to the diameter of the guide hole of the spinneret plus 1.8 mm, and the spinneret is a circular spinneret. The difference between the diameter of the circular spinneret and the maximum length of the long axis of the series is 15 mm, the diameter of the spinneret is 2.5 mm, the number of spinneret holes is 260, and the cross section shape of the spinneret spinning hole is flat.

The porous ultra-soft ultra-fine denier polyester fiber is prepared by metering, extruding, cooling, oiling and winding the modified polyester chips that is granulated from the modified polyester. The main spinning process parameters are: spinning temperature 295° C., wind temperature 23° C., HT1 temperature 75° C., HT2 temperature 125° C., winding speed 4950 m/min. At the temperature of 80° C., the increasing rate of the space gap between the molecular chain inside the fiber, and the decreasing rate of the melt viscosity at the temperature of 289° C., and the data of mechanical properties of the fiber is:

TABLE 8 the different shrinkage composite yarn's mechanical properties when use the polyester from EXAMPLE 21 to EXAMPLE 24

| EXAMPLE | Modified polyester source | Breaking strength (cN/dtex) | Elongation at break (%) | Increased gap (v/v/%) | Viscosity decreasing rate (%) | Fiber density deviation rate (%) | CV value of breaking strength (%) | CV value of elongation break (%) | CV value of yarn unevenness (%) | Size of singular fiber (dtex) | Initial modulus (cN/dtex) |
|---|---|---|---|---|---|---|---|---|---|---|---|
| 50 | EXAMPLE 21 | 3.4 | 35.3 | 15 | 16 | 0.5 | 3.1 | 6.7 | 1.3 | 0.37 | 62 |
| 51 | EXAMLPE 22 | 3.2 | 35.5 | 15 | 16 | 0.3 | 2.5 | 6.8 | 1.4 | 0.36 | 61 |
| 52 | EXAMPLE 23 | 3.5 | 35.7 | 15 | 16 | 0.2 | 2.9 | 6.4 | 1.7 | 0.35 | 63 |
| 53 | EXAMPLE 24 | 2.9 | 35.6 | 15 | 16 | 0.3 | 2.8 | 6.6 | 1.4 | 0.38 | 62 |

Example 54-57

The invention relates to a preparation method of porous ultra-soft ultra-fine denier polyester fiber, which is made from a porous spinneret. The arrangement of holes on the spinneret is elliptical, which means that the spinning hole center of the spinneret is located on a concentric ellipse. Concentric ellipse is a series of ellipses, all ellipses of the long axis collinear, and short axis collinear.

The arrangement of the orifices is long axis symmetry. The ratio of the length of the long axis to the short axis of the ellipse is 1.8, the spacing of the adjacent spinneret is equal to the diameter of the guide hole of the spinneret plus 1.5 mm, and the spinneret is a circular spinneret. The difference between the diameter of the circular spinneret and the maximum length of the long axis of the series is 16 mm, the diameter of the spinneret is 1.8 mm, the number of spinneret holes is 300, and the cross section shape of the spinneret spinning hole is hollow.

The porous ultra-soft ultra-fine denier polyester fiber is prepared by metering, extruding, cooling, oiling and winding the modified polyester chips that is granulated from the modified polyester. The main spinning process parameters are: spinning temperature 290° C., wind temperature 25° C., HT1 temperature 85° C., HT2 temperature 127° C., winding speed 4600 m/min. At the temperature of 130° C., the increasing rate of the space gap between the molecular chain inside the fiber, and the decreasing rate of the melt viscosity at the temperature of 260° C., and the data of mechanical properties of the fiber is:

high pressure machine under the following conditions: before dyeing, the porous ultra-soft ultra-fine denier polyester fiber is treated with a nonionic surfactant at 60° C. for 30 minutes, and then added to the dyeing solution. In the dyeing solution, the disperse dye content is 2.0% (o.w.f). The dispersant is NNO. The concentration of dispersant NNO is 1.2 g/L and the pH value is 5, the bath ratio is 1:50. Dye the yarn at 60° C., and then raise the temperature to 90° C., 100° C., 110° C., 120° C. and 130° C., dye at each temperature for 1 hour.

Dye the common fibers under the same dyeing conditions. The percentage of dyeing of the porous ultra-soft ultra-fine denier polyester fiber after dyeing is obtained by the following method:

The percentage of dyeing is determined by the residual liquid colorimetric method. Take the appropriate amount of dyeing stock solution and dyeing residue, and add N, N-2 methylformamide (DMF) and distilled water. The ratio of DMF to water in the dye solution is 70/30 (v/v), the absorbance of the dye solution is measured by an ultraviolet—visible spectrophotometer, and the percentage of dyeing is calculated by the following formula.

$$\text{Percentage of dyeing} = 100\% \times \left(1 - \frac{A1}{A0}\right)$$

In the formula above, A0 and A1 are respectively the absorbances of the dyeing stock solution and the dye residue.

TABLE 9 the different shrinkage composite yarn's mechanical properties when use the polyester from EXAMPLE 25 to EXAMPLE 28

| EXAMPLE | Modified polyester source | Breaking strength (cN/dtex) | Elongation at break (%) | Increased gap (v/v/%) | Viscosity decreasing rate (%) | Fiber density deviation rate (%) | CV value of breaking strength (%) | CV value of elongation break (%) | CV value of yarn unevenness (%) | Size of singular fiber (dtex) | Initial modulus (cN/dtex) |
|---|---|---|---|---|---|---|---|---|---|---|---|
| 54 | EXAMPLE 25 | 3.4 | 33.1 | 30 | 10 | 0.2 | 3.1 | 5.7 | 0.9 | 0.27 | 62 |
| 55 | EXAMPLE 26 | 3.2 | 33.5 | 30 | 10 | 0.3 | 2.8 | 5.8 | 1.4 | 0.29 | 61 |
| 56 | EXAMPLE 27 | 3.5 | 33.4 | 30 | 10 | 0.1 | 2.4 | 5.4 | 0.7 | 0.25 | 64 |
| 57 | EXAMPLE 28 | 2.9 | 32.6 | 30 | 10 | 0.3 | 2.7 | 5.6 | 1.1 | 0.28 | 65 |

Example 58

Dyeing Process of Porous Ultra-Soft Ultra-Fine Denier Polyester Fiber:

The porous ultra-soft ultra-fine denier polyester fiber prepared in EXAMPLE 29 is dyed in a high temperature and When the disperse dye is disperse red 3B, disperse blue SE-2R or disperse turquoise S-GL, the dyeing percentage of porous ultra-soft ultra-fine denier polyester fiber and common fiber is as follows:

TABLE 10 the comparison of the percentage of dyeing between different shrinkage composite yarn and common fiber when use modified polyester prepared in EXAMPLE 29.

| dye | | temperature | 90° C. | 100° C. | 110° C. | 120° C. | 130° C. |
|---|---|---|---|---|---|---|---|
| Disperse red 3B | | Porous ultra-soft ultra-fine denier polyester fiber | 50.8 | 78.3 | 84.9 | 88.3 | 90.5 |
| | | Common fiber | 28.2 | 46.3 | 78.5 | 81.7 | 90.2 |
| Disperse blue SE-2R | | Porous ultra-soft ultra-fine denier polyester fiber | 53.6 | 78.7 | 84.4 | 86.4 | 89.9 |
| | | Common fiber | 12.3 | 35.7 | 73.4 | 88.9 | 91.3 |

TABLE 10-continued the comparison of the percentage of dyeing between different shrinkage composite yarn and common fiber when use modified polyester prepared in EXAMPLE 29.

| dye | temperature | 90° C. | 100° C. | 110° C. | 120° C. | 130° C. |
|---|---|---|---|---|---|---|
| Scattered turquoise blue S-GL | Porous ultra-soft ultra-fine denier polyester fiber | 44.8 | 70.4 | 76.3 | 83.7 | 86.7 |
| | Common fiber | 11.8 | 36.3 | 70.9 | 75.6 | 82.6 |

By comparing the dyeing effect of the porous ultra-soft ultra-fine denier polyester fiber with the common fiber, it can be seen that the dyeing effect of the porous ultra-soft ultra-fine denier polyester fiber is obviously superior to that of the ordinary fiber, and it can also be seen that the branched diol segment in the macromolecule of the modified polyester prepared in the invention, making the rate of increase much greater than the free volume unbranched general properties of the polyester of the macromolecular chains. The increase of the free volume helps fine particles go into the interior of the polyester, the free volume of the polyester fiber made from the modified polyester is much larger than that of the unbranched ordinary polyester fiber at the same temperature, which increases the diffusion degree of the dye and improves the dyeing property of the polyester fiber.

Example 59

Dyeing Process of Porous Ultra-Soft Ultra-Fine Denier Polyester Fiber:

The porous ultra-soft ultra-fine denier polyester fiber prepared in EXAMPLE 31 is dyed in a high temperature and high pressure machine under the following conditions: before dyeing, the porous ultra-soft ultra-fine denier polyester fiber is treated with a nonionic surfactant at 60° C. for 30 minutes, and then added to the dyeing solution. In the dyeing solution, the disperse dye content is 2.0% (o.w.f). The dispersant is NNO. The concentration of dispersant NNO is 1.2 g/L and the pH value is 5, the bath ratio is 1:50. Dye the yarn at 60° C., and then raise the temperature to 90° C., 100° C., 110° C., 120° C. and 130° C., dye at each temperature for 1 hour.

Dye the common fibers under the same dyeing conditions. The percentage of dyeing of the porous ultra-soft ultra-fine denier polyester fiber after dyeing is obtained by the following method:

The percentage of dyeing is determined by the residual liquid colorimetric method. Take the appropriate amount of dyeing stock solution and dyeing residue, and add N, N-2 methylformamide (DMF) and distilled water. The ratio of DMF to water in the dye solution is 70/30 (v/v), the absorbance of the dye solution is measured by an ultraviolet-visible spectrophotometer, and the percentage of dyeing is calculated by the following formula.

$$\text{Percentage of dyeing} = 100\% \times \left(1 - \frac{A1}{A0}\right)$$

In the formula above, A0 and A1 are respectively the absorbances of the dyeing stock solution and the dye residue.

When the disperse dye is disperse red 3B, disperse blue SE-2R or disperse turquoise S-GL, the dyeing percentage of porous ultra-soft ultra-fine denier polyester fiber and common fiber is as follows:

TABLE 11 the comparison of the percentage of dyeing between different shrinkage composite yarn and common fiber when use modified polyester prepared in EXAMPLE 31

| dye | temperature | 90° C. | 100° C. | 110° C. | 120° C. | 130° C. |
|---|---|---|---|---|---|---|
| Disperse red 3B | Porous ultra-soft ultra-fine denier polyester fiber | 51.3 | 86.3 | 89.0 | 93.8 | 95.5 |
| | Common fiber | 28.2 | 46.3 | 78.5 | 81.7 | 90.2 |
| Disperse blue SE-2R | Porous ultra-soft ultra-fine denier polyester fiber | 62.3 | 80.2 | 89.9 | 92.7 | 96.3 |
| | Common fiber | 12.3 | 35.2 | 73.4 | 88.9 | 91.3 |
| Scattered turquoise blue 5-GL | Porous ultra-soft ultra-fine denier polyester fiber | 54.9 | 76.4 | 80.2 | 85.2 | 89.2 |
| | Common fiber | 11.8 | 36.3 | 70.9 | 75.6 | 82.6 |

By comparing the dyeing effect of the porous ultra-soft ultra-fine denier polyester fiber with the common fiber, it can be seen that the dyeing effect of the porous ultra-soft ultra-fine denier polyester fiber is obviously superior to that of the ordinary fiber, and it can also be seen that the branched diol segment in the macromolecule of the modified polyester prepared in the invention, making the rate of increase much greater than the free volume unbranched general properties of the polyester of the macromolecular chains. The increase of the free volume helps fine particles go into the interior of the polyester, the free volume of the polyester fiber made from the modified polyester is much larger than that of the unbranched ordinary polyester fiber at the same temperature, which increases the diffusion degree of the dye and improves the dyeing property of the polyester fiber.

What is claimed is:

1. A porous ultra-soft ultra-fine denier polyester fiber, comprising a modified polyester, and the modified polyester is composed of a terephthalic acid chain, an ethylene glycol chain and a diol chain containing a branched hexanediol;
  a size of the porous ultra-soft ultra-fine denier polyester fiber is 0.20-0.50 dtex; an initial modulus is ≤65 cN/dtex; a breaking strength is ≥3.8 cN/dtex; an elongation at break is 35.0±3.0%;
  at a temperature of 80° C.-130° C., a space gap between molecular chains in the modified polyester increases by 10-30 v/v %;
  at a temperature of 260-290° C., a melt viscosity decreases by 10-20%;
  a deviation rate of fiber density of the porous ultra-soft ultra-fine denier polyester fiber is ≤0.5%;
  a CV value of breaking strength is ≤4.0%, and a CV value of elongation at break is ≤8.0%, and a CV value of coiling shrinkage coefficient of variation is ≤8.0%, and a CV value of yarn unevenness is ≤2.0%;
  wherein, the increase of the space gap between the molecular chains refers to a comparison of the spatial gaps between molecular chains at a same temperature between the modified polyester and a polyester without the branched hexanediol;
  the branched hexanediol is one or more items selected from the group consisting of 2-pentyl-1,6 hexanediol, 2-hexyl-1,6 hexanediol, 2-heptyl-1,6 hexanediol, 2-octyl-1, and 6 hexanediol.

2. A method of preparation of the porous ultra-soft ultra-fine denier polyester fiber according to claim 1, wherein the modified polyester is spun from a porous spinneret to produce the porous ultra-soft ultra-fine denier polyester fiber, and an arrangement of spinneret holes in the porous spinneret is an elliptical arrangement; the elliptical arrangement means that the centers of the spinning holes of the spinneret are located on the concentric ellipses, the concentric ellipses are a series of ellipses, the long axes of all the ellipses are collinear, and the short axes of all the ellipses are collinear;
  the method comprising:
  granulating the modified polyester to obtain modified polyester chips, then obtaining the porous ultra-soft ultra-fine denier polyester fiber by metering, extruding, cooling, oiling and high-speed winding the modified polyester chips;
  wherein, a method for preparing the modified polyester comprises
  (1) preparation of terephthalic acid glycol ester:
  mixing terephthalic acid and the branched hexanediol to a first slurry, and carrying out a first esterification reaction under a catalytic action of concentrated sulfuric acid to obtain the terephthalic acid glycol ester;
  (2) preparation of ethylene terephthalate:
  mixing the terephthalic acid and ethylene glycol to a second slurry, carrying out a second esterification reaction to obtain the ethylene terephthalate;
  (3) preparation of modified polyester:
  after the second esterification reaction in the step (2) is completed, adding the terephthalic acid glycol ester prepared in the step (1), stirring and mixing, performing a polycondensation reaction under the action of the catalyst and the stabilizer, and under a condition of a negative pressure; first in a low vacuum stage and then in a high vacuum stage to obtain the modified polyester.

3. The method of claim 2, wherein, in the method for preparing the modified polyester
  the first slurry in the step (1) is added to a first reactor for carrying out the first esterification reaction; the first esterification reaction is carried out under a pressurized nitrogen environment, and the pressure is in a range of a normal pressure to 0.3 MPa, and a temperature is 180-240° C.; the first esterification reaction ends when a water distillation amount in the first esterification reaction reaches at least 90% of a first theoretical value; then the terephthalic acid glycol ester is obtained;
  the second slurry in the step (2) is added into a second reactor for carrying out the second esterification reaction; the second esterification reaction is carried out under a pressurized nitrogen environment, and the pressure is in a range of normal pressure to 0.3 MPa, and a temperature is 250-260° C.; the second esterification reaction ends when a water distillation amount in the second esterification reaction reaches at least 909% of a second theoretical; then the ethylene terephthalate is obtained;
  in step (3) the stirring and mixing is performed for 15-20 minutes under the action of the catalyst and the stabilizer, and the negative pressure; in the polycondensation reaction under the condition of the low-vacuum stage, the pressure is smoothly pumped from the normal pressure to an absolute pressure under 500 Pa, a temperature is controlled at 260-270° C., and a reaction time is 30-50 minutes; then turn to the high vacuum stage, the polycondensation reaction continues and the reaction pressure is reduced to an absolute pressure of less than 100 Pa, and the reaction temperature is controlled at 275 to 280° C., and the reaction time is 50 to 90 minutes in order to obtain the modified polyester;
  main spinning process parameters of the porous ultra-soft ultra-fine denier polyester fiber are as follows:
  an extruding temperature is 290-295° C.;
  a wind temperature is 20-25° C.;
  a winding speed is 3000-4000 m/min.

4. The method of claim 2, wherein, in the method for preparing the modified polyester:
  in step (1), a molar ratio of the terephthalic acid to the branched diol is 1:1.3-1.5; an amount of concentrated sulfuric acid added is 0.3-0.5% of a weight of terephthalic acid; a concentration of concentrated sulfuric acid is 50-60 wt %;
  in step (2), a molar ratio of the terephthalic acid to the ethylene glycol is 1:1.2-2.0;
  in step (3), a molar percentage value of the diol terephthalate and the ethylene terephthalate is 2-5%; the catalyst is antimony trioxide, antimony glycol or antimony acetate, and an amount of catalyst added is 0.01%-0.05% of a total weight of terephthalic acid; the stabilizer is triphenyl phosphate, trimethyl phosphate or trimethyl phosphite, and an amount of stabilizer added is 0.01%-0.05% of the total weight of terephthalic acid;
  a number average molecular weight of the modified polyester ranges from 15000-30000.

5. The method of claim 2, wherein the spinneret holes are arranged symmetrically along the long axes and/or the short axes of the concentric ellipses.

6. The method of claim 2, wherein a ratio of a length of the long axis of the ellipse to a length of the short axis is 1.3-1.8; a spacing of the adjacent spinneret holes is greater than a diameter of the guide hole of the spinneret hole plus 1.5 mm.

7. The method of claim 2, wherein the porous spinneret is a circular spinneret or an elliptical spinneret; a difference between a diameter of the circular spinneret and a maximum length of the long axis of the series ellipse is greater than 10 mm, and a difference between a length of a long axis of the elliptical spinneret and the maximum length of the long axis of the series ellipse is greater than 10 mm.

8. The method of claim 2, wherein a guide hole diameter of the spinneret is 1.5-2.5 mm; a number of spinneret holes is greater than or equal to 192.

9. The method of claim 2, wherein the cross-section shape of the spinneret spinning hole is a circle, square, diamond, linear shape, triangle, trilobal shape, hollow type or flat type.

* * * * *